(12) United States Patent
Buchheit

(10) Patent No.: US 8,259,132 B2
(45) Date of Patent: Sep. 4, 2012

(54) ROTATIONALLY DEPENDENT INFORMATION IN A THREE DIMENSIONAL GRAPHICAL USER INTERFACE

(76) Inventor: Brian K. Buchheit, Davie, FL (US)

(*) Notice: Subject to any disclaimer, the term of this patent is extended or adjusted under 35 U.S.C. 154(b) by 876 days.

(21) Appl. No.: 11/468,180

(22) Filed: Aug. 29, 2006

(65) Prior Publication Data

US 2008/0059910 A1    Mar. 6, 2008

(51) Int. Cl.
G09G 5/00 (2006.01)
(52) U.S. Cl. ........................................ 345/619
(58) Field of Classification Search .................. 345/428, 345/619
See application file for complete search history.

(56) References Cited

U.S. PATENT DOCUMENTS

| | | | |
|---|---|---|---|
| 5,303,388 A * | 4/1994 | Kreitman et al. | 715/836 |
| 5,452,414 A * | 9/1995 | Rosendahl et al. | 715/836 |
| 5,517,405 A | 5/1996 | McAndrew et al. | |
| 5,971,589 A * | 10/1999 | Hazama et al. | 700/145 |
| 6,292,830 B1 | 9/2001 | Taylor et al. | |
| 6,340,577 B1 | 1/2002 | Hope et al. | |
| 6,348,927 B1 * | 2/2002 | Lipkin | 345/619 |
| 6,363,404 B1 * | 3/2002 | Dalal et al. | 715/201 |
| 7,137,566 B2 * | 11/2006 | Silverbrook et al. | 235/494 |
| 7,266,768 B2 * | 9/2007 | Ferlitsch et al. | 715/273 |
| 7,885,820 B1 | 2/2011 | Mancisidor et al. | |
| 2002/0109680 A1 * | 8/2002 | Orbanes et al. | 345/418 |
| 2003/0007013 A1 * | 1/2003 | Gatis | 345/853 |
| 2003/0103064 A1 * | 6/2003 | Knighton et al. | 345/660 |
| 2004/0102245 A1 * | 5/2004 | Escalera et al. | 463/32 |
| 2006/0066754 A1 * | 3/2006 | Zaima | 348/564 |

* cited by examiner

Primary Examiner — Edward Martello
(74) Attorney, Agent, or Firm — Patents on Demand P.A.; Brian K. Buchheit; Scott M. Garrett

(57) ABSTRACT

A method for presenting digital objects in a electronic space that corresponds to a physical analog having N sides along a directional axis. The digital object can be rotated in an electronic space along the directional axis. A visual rendering of the rotated object is presented within a display, with a number of sides different than N. Accordingly, digital objects can be overloaded with information in a rotationally dependent manner.

20 Claims, 5 Drawing Sheets

300

| Physical Analog | Digital Representation |
|---|---|
|  |  |
|  |  |

ROTATIONALLY DEPENDENT INFORMATION IN A THREE DIMENSIONAL GRAPHICAL USER INTERFACE

BACKGROUND

1. Field of the Invention

The present invention relates to the field of information presentation and, more particularly, to the display of information in an electronic space that is rotationally dependent.

2. Description of the Related Art

The presentation of information is a crucial component of business that is often underappreciated. Most software applications present information obtained from an electronic space using a visual modality, sometimes supplemented with an alternative audio presentation of the information. A series of tools have been developed to facilitate the presentation and user selection manipulation of information. Conventional interface tools include, for example, hot-keys, menus, toolbars, pop-up command lists, mouse clicks, and the like. Together, these tools facilitate user interaction with the information in the electronic space. However, the majority of existing tools are severely limited in the ways in which they display information.

The primary limitation to these software tools is the manner in which information can be displayed without losing logical continuity, display area, and integrity. For example, a popular method for displaying information is through pop-up windows. With pop-up windows, as the number of user activated pop-up windows increases, the amount of visible display area decreases. Soon, the pop-up windows clutter the interface and obscure the information that is being displayed. Also, a use of too many pop-up windows can degrade system performance, since each window can consume computing resources.

Another problem with many existing implementations is that the tool functions in an expected and linear manner. That is, the elements act in a way that is consistent with a physical reality. For example, selecting the forward-facing or "next" button displays the subsequent page of a numeric sequence. Additionally, the amount of information that can be displayed is limited by the quantity of available space of the object. For example, the amount of information contained in a book is limited by the number of pages it contains and each page can only display two sides of information.

To cope with these shortcomings, many tools have become overly complex and cumbersome. Users are forced to use these limited, cluttered, and complex tools without a reasonable alternative. Worse, few standards exist, as each attempted method has many flaws, so tool users are often forced to learn new interface tools for each software application that they use.

SUMMARY OF THE INVENTION

The present invention discloses a method for displaying of information that need not be bound by conventional relationships between digital objects visually presented on a display and corresponding physical analogs for these digital objects. The invention assumes that the physical analog that is being digitally represented is a solid object having sides of the same basic shape regardless of rotation. An example of such an object is a book. Although not all sides of the book are equivalent in dimensions, all are quadrilateral in shape. Using the present invention, a digital object for the book can be rotationally overloaded. That is, using one set of rotational tools, the digital book can be treated like its physical analog. Using another set of rotational tools with the book, the physical analogy can be severed and additional information can be presented. For example, the digital book can be rotated upwards to provide a set of user selectable commands related to the book.

The present invention can be implemented in accordance with numerous aspects consistent with material presented herein. For example, one aspect of the present invention can include a method for presenting digital objects in an electronic space that corresponds to a physical analog having N sides along a directional axis. The digital object can be rotated in an electronic space along the directional axis. A visual rendering of the rotated object is presented within a display, with a number of sides different than N.

Another aspect of the present invention can include a method for presenting digital objects within a computing interface. This computing interface includes a visual interface for displaying a digital object and user selectable rotational controls. Upon receiving a user selection to rotate the digital object along a designated axis, the interface visually renders the digital object so that a digital representation of the rotated object is approximately equivalent to a representation for a physical analog of the digital object when the physical analog is rotated in a corresponding fashion. A user selection to rotate the digital object in an alternate fashion results in an alternate digital representation for the rotated object that is not approximately equivalent to a representation for the physical analog of the digital object when the physical analog is rotated in a corresponding fashion.

Still another aspect of the present invention can include a graphical user interface (GUI). The graphical user interface can include a digital object, which is rotatable in response to a user selection, and a set of rotational controls. A combination of a selection of one of the rotational controls and a user rotation of the digital object results in the digital object being rendered in the graphical user interface in a manner approximately equivalent to a rotated view resulting from a approximately equivalent rotation of a physical analog of the digital object. Yet, a selection of a different one of the rotational controls and a user rotation of the digital object results in the digital object being rendered in the graphical user interface in a manner that is not approximately equivalent to a rotated view resulting from an approximately equivalent rotation of the physical analog of the digital object.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
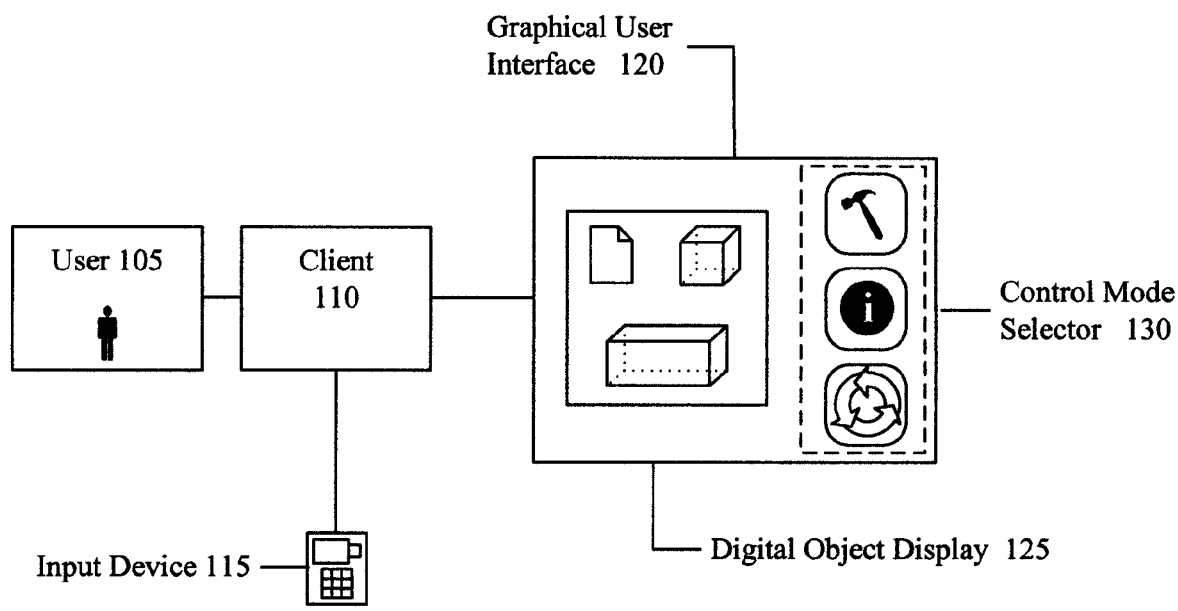
FIG. 1 is a schematic diagram of a system for displaying rotationally dependent information in accordance with an embodiment of the inventive arrangements disclosed herein.

FIG. 1 is a schematic diagram of a system 100 for displaying rotationally dependent information in accordance with an embodiment of the inventive arrangements disclosed herein. In system 100, user 105 can view rotationally dependent information via graphical user interface 120 running on client 100. User 105 interacts with graphical user interface 120 using at least one input device 115 attached to client 110. Client 110 can be any of a variety of computing devices including, but not limited to, a personal computer, a kiosk, a personal data assistant (PDA), a mobile phone, a video game device, a media player, and the like. Input device 115 can be any of a variety of input devices including, but not limited to, a keyboard, a mouse, a voice command device including an audio transducer, a keypad, and the like.

Graphical user interface 120 can include digital object display 125 and control mode selector 130. Digital object display 125 can include any of a variety of display methods that can be used within graphical user interface 120 including, but not limited to, pop-up window, a GUI window, an applet, and the like. Control mode selector 130 can be any of a variety of selection methods that can be used within graphical user interface 120 including, but not limited to, a set of selectable buttons, a set of radio buttons, a set of checkboxes, and the like.

Note how GUI 120 can be a 3-dimensional GUI showing 3-dimensional objects, as in a first-person perspective game. Objects can be manipulated in a rotationally dependent fashion. This permits a maximizing of conveyable information in a consistent, natural way. For example, a weapon in a game shown in GUI 120 can have a rotational mode available in control mode selector 130. Selection of this mode displays weapon specification, options, and related information. A user selection of a different mode will treat the weapon in a fashion analogous to a physical weapon.

In another example, a physical library can be represented digitally in GUI 120. The electronic books in the digital library can be selected and read in a manner that is analogous to their physical counterparts by a user. However, selection of a rotational mode and direction by a user would offer additional information not contained in the printed book. For example, an upwards rotation of a specified page displays a corresponding literary analysis. In another example, a user could highlight a word in the digital representation of the book page and select a specific mode coupled with a rotational direction resulting in the display of a dictionary entry for the highlighted word within GUI 120.

Figure 2:
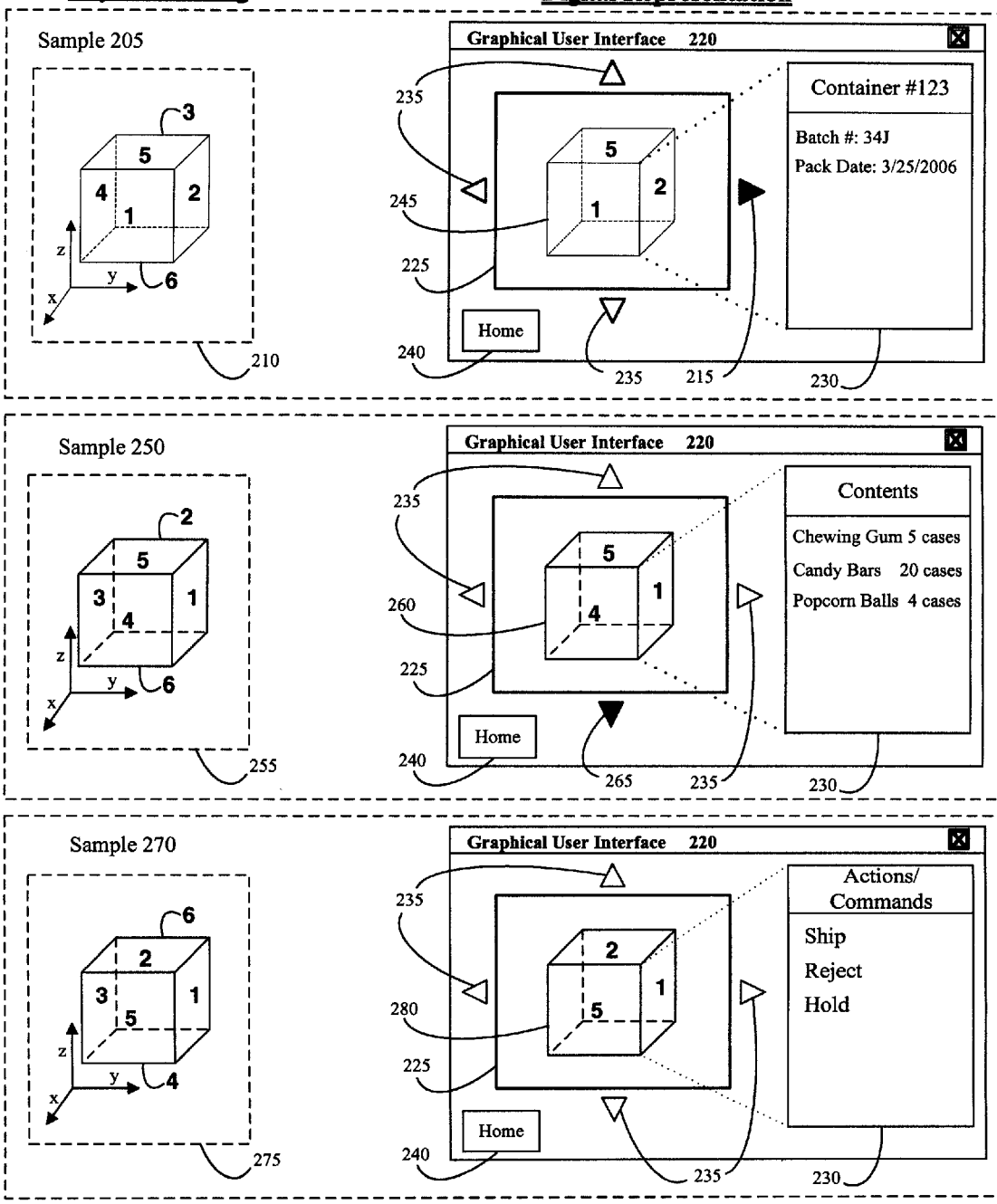
FIG. 2 illustrates a collection of successive sample user operations made upon a physical analog and their resultant digital representations in accordance with an embodiment of the inventive arrangements disclosed herein.

FIG. 2 illustrates a collection 200 of successive sample user operations made upon a physical analog and their resultant digital representations in accordance with an embodiment of the inventive arrangements disclosed herein. For illustrative purposes, the physical analog corresponds to a rectangular box, comprised of six planes, such as one used for the shipping of goods. The box has four sides along a directional axis.

Sample 205 includes physical analog 210 and graphical user interface 220. The sides of physical analog 210 and digital object 245 are numbered for illustrative purposes. Graphical user interface 220 can include electronic space 225, rotational controls 235 and 215, digital object 245, data display 230, and home button 240. It should be noted that rotational control 215 is labeled and colored differently than rotational controls 235 to illustrate a user selection to produce successive results.

In this example, digital object 245 is a digital representation of physical analog 210 displayed in electronic space 225. Digital object 245 is approximately equivalent to physical analog 210, having the same shape and orientation.

As indicated by the dotted lines, the contents of data display 230 are associated with side 1 of digital object 245. It should be appreciated that the information contained in data display 230 does not necessarily exist on physical analog 210. In sample 205, data display 230 presents a user with high-level information about physical analog 210.

Selection of home button 240 by a user causes the elements of graphical user interface 220 to revert to a predetermined originating state. The selection of home button 240 supersedes the sequence of user-selected rotations.

The selection of rotational control 215 by a user results in a counter-clockwise rotation of digital object 245 along the Z-axis, in the XY-plane, as illustrated in sample 250. In this example, both digital object 260 and physical analog 255 reflect the counter-clockwise rotation; both now have side 4 in the forefront. Digital object 260 is still approximately equivalent to physical analog 255.

Likewise, the contents of data display 230 is associated with side 4 of digital object 260. It should be appreciated that the information contained in data display 230 does not exist necessarily on physical analog 255. In sample 250, data display 230 presents a user with information specific to physical analog 255. It should also be noted that rotational control 265 is labeled and colored differently than rotational controls 235 to illustrate a user selection to produce successive results. The remaining elements of graphical user interface 220 remain unchanged.

The selection of rotational control 265 by a user results in a forward rotation of digital object 260 along the 4-axis, in the YZ-plane, as illustrated in sample 270. In this example, both digital object 280 and physical analog 275 reflect the forward rotation; both not have side 5 in the forefront. Digital object 280 is still approximately equivalent to physical analog 275.

Furthermore, the contents of data display 230 are associated with side 5 of digital object 275. It should be appreciated that the information contained in data display 230 does not exist necessarily on physical analog 275. In sample 270, data display 230 presents a use with a set of commands that can be selected by a user that represent actions to be performed on physical analog 275. The remaining elements of graphical user interface 220 remain unchanged.

Figure 3:
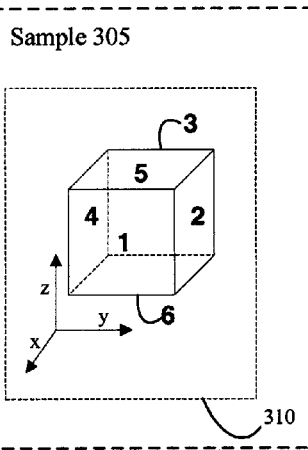
FIG. 3 illustrates a collection of successive sample user operations made upon a physical analog and their resultant digital representations in accordance with an embodiment of the inventive arrangements disclosed herein.
Figure 3:
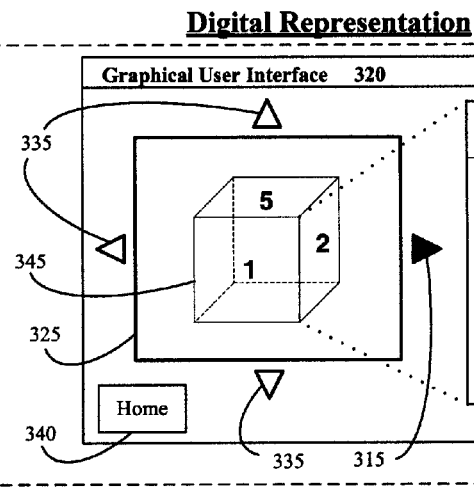
Figure 3:
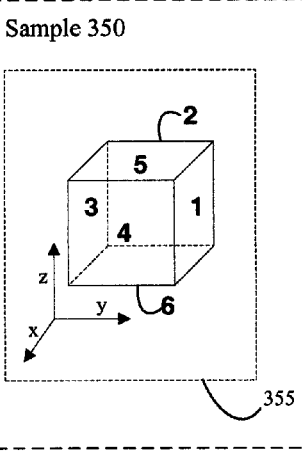
Figure 3:
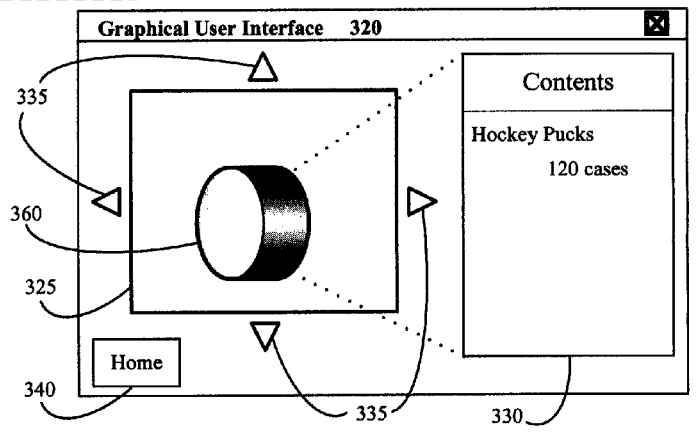

FIG. 3 illustrates a collection 300 of successive sample user operations made upon a physical analog and their resultant digital representations in accordance with an embodiment of the inventive arrangements disclosed herein. For illustrative purposes, the physical analog corresponds to a rectangular box, comprised of six planes, such as one used for the shipping of goods. The box has four sides along a directional axis.

Sample 305 includes physical analog 310 and graphical user interface 320. The sides of physical analog 310 and digital object 345 are numbered for illustrative purposes. Graphical user interface 320 can include electronic space 325, rotational controls 335 and 315, digital object 345, data display 330, and home button 340. It should be noted that rotational control 315 is labeled and colored differently than rotational controls 335 to illustrate a user selection to produce successive results.

In this example, digital object 345 is a digital representation of physical analog 310 displayed in electronic space 325. Digital object 345 is approximately equivalent to physical analog 310, having the same shape and orientation.

As indicated by the dotted lines, the contents of data display 330 are associated with side 1 of digital object 345. It should be appreciated that the information contained in data display 330 does no necessarily exist on physical analog 310. In sample 305, data display 330 presents a user with high-level information about physical analog 310.

Selection of home button 340 by a user causes the elements of graphical user interface 320 to revert to a predetermined originating state. The selection of home button 340 supersedes the sequence of user-selected rotations.

The selection of rotational control 315 by a user results in a rotation of digital object 345 along the Z-axis, in the XY-plane, as illustrated in sample 350. In this example, physical analog 355 reflects a counter-clockwise rotation, having side 4 in the forefront. Digital object 360 is not longer approximately equivalent to physical analog 355. The remaining elements of graphical user interface 320 remain unchanged.

This example illustrates that the result of rotating a digital object could result in another digital object. This allows for the linking of a multiplicity of objects, each with related information, within the same interface.

Figure 4:
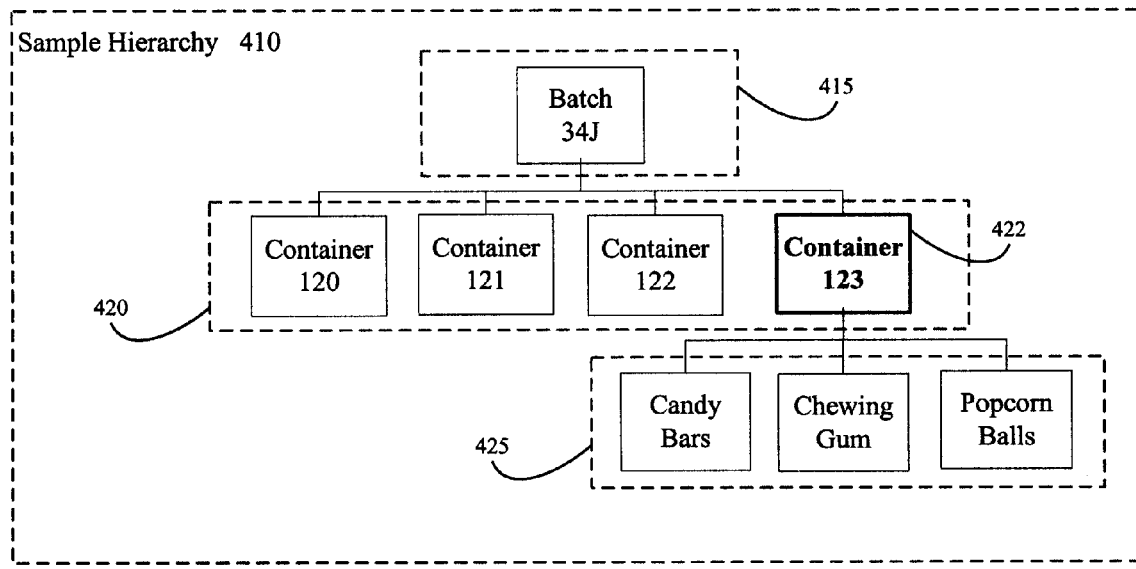
FIG. 4 is a collection of illustrations representing the display of hierarchical information within a rotationally dependent graphical user interface in accordance with an embodiment of the inventive arrangements disclosed herein.
Figure 4:
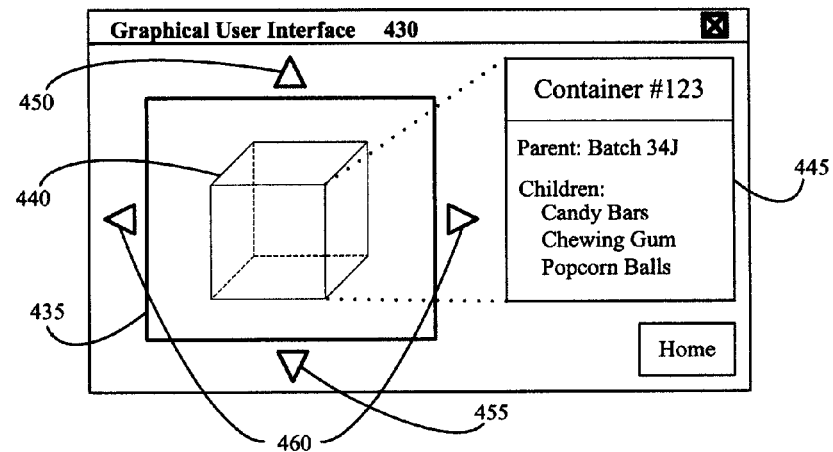

FIG. 4 is a collection 400 of illustrations representing the display of hierarchical information within a rotationally dependent graphical user interface in accordance with an embodiment of the inventive arrangements disclosed herein. For illustrative purposes, sample hierarchy 410 illustrates the relationships between the various pieces of information displayed in system 200.

Sample hierarchy 410 includes root object 415, primary child objects 420, and second child objects 425. It should be noted that emboldened box 422 represents physical analog 210. The lines connecting boxes represent the relationship between the objects.

The placement of root object 415 at the top of the hierarchy means that it is the start of the information chain. Primary child objects 420 are subordinate to root object 415. The secondary child object 425 are only subordinate to emboldened box 422 and not other members of primary child objects 420.

Graphical user interface 430 depicts the digital representation of emboldened box 422. Graphical user interface 430 can include electronic space 435, digital object 440, data display 445, upwards rotational control 450, downwards rotational control 455, and lateral rotational controls 460.

As indicated by the dotted lines, the contents of data display 445 are associated with the foremost side of digital object 440. In this example, data display 445 presents a user with information about emboldened box 422.

Upwards rotational control 450, downwards rotational control 455, and lateral rotational controls 460 are user-selectable controls that allow a user to navigate sample hierarchy 410. Selection of upwards rotational control 450 by a user would present the information of root object 415 in graphical user interface 430. Likewise, selection of downwards rotational control 455 by a user would present the information of one of the members of secondary child objects 425 in graphical user interface 430. Selection of either lateral rotational control 460 by a user would present the information of another member of primary child objects 420 in graphical user interface 430. It should be noted that the availability of rotational directions is limited by the structure of the hierarchy. In this example, if root object 415 is displayed in graphical user interface 430, then its only available rotation is downwards because it only has children objects. However, in the present representation of graphical user interface 430, emboldened object 422 has all rotational directions available because its position in the hierarchy dictates that it has parent, sibling, and child objects.

It should also be appreciated that a digital object can have a multiplicity of available interface modes, such as a hierarchy mode, a graphical mode, and a user command mode. Additionally, the availability of rotational directions and the quantity of sides available in a specified direction can be dependent on a user selected interface mode. For example, a digital object may have five upwards sides or hierarchical levels when in a hierarchy mode, four upwards sides when in a graphical mode, and three upwards sides when in a command mode.

Figure 5:
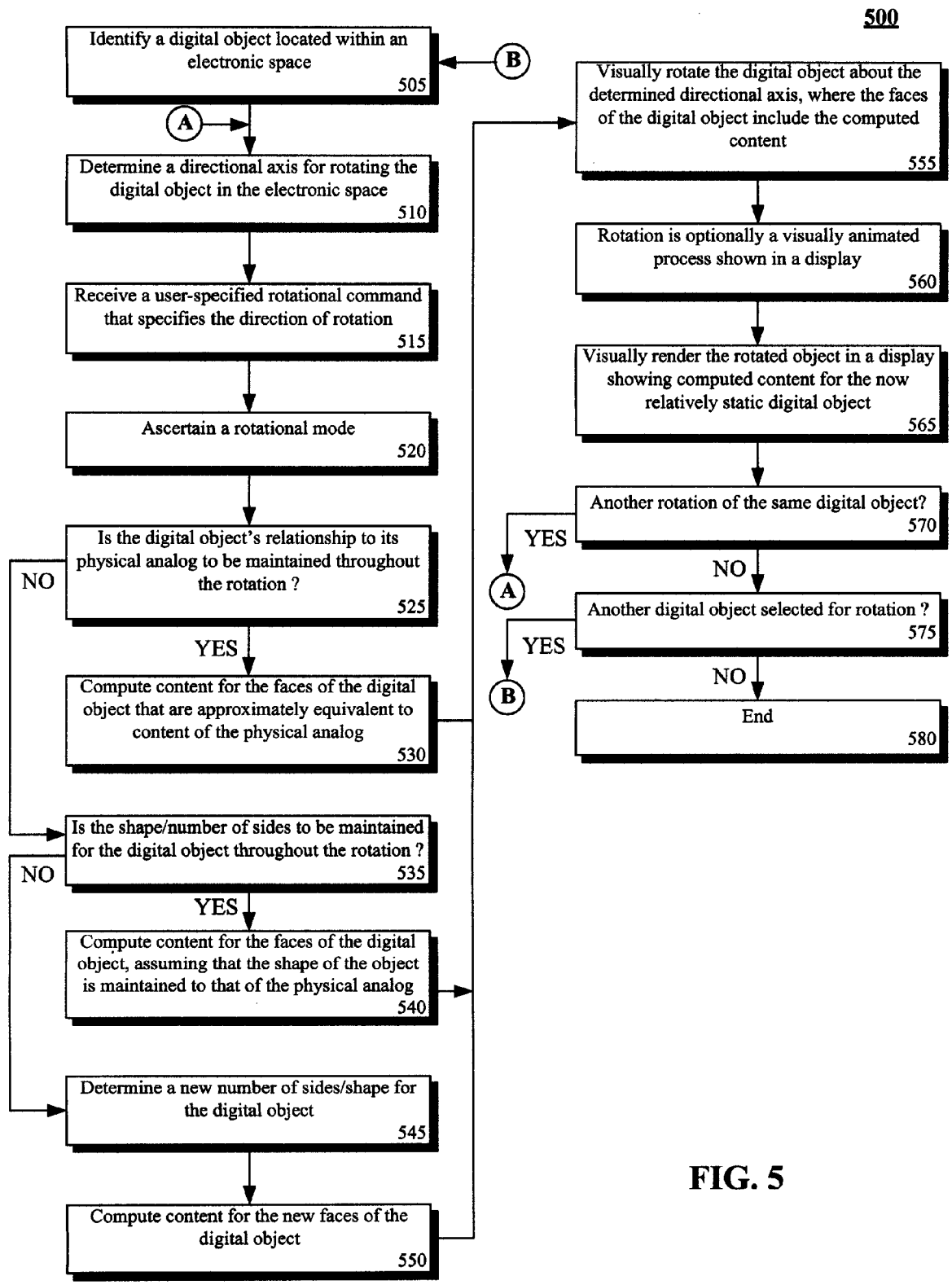
FIG. 5 is a flow chart of a method for presenting information in a rotationally dependent manner in accordance with an embodiment of the inventive arrangements disclosed herein.

FIG. 5 is a flow chart of a method 500 for presenting information in a rotationally dependent manner in accordance with an embodiment of the inventive arrangements disclosed herein. Method 500 can be performed in the context of system 100 or in the context of any other system allowing the display of rotationally dependent information. Additionally, method 500 can be performed in the context of GUI 220, GUI 320, or GUI 430 or in the context of any other GUI that supports the display of rotationally dependent information.

Method 500 can begin in step 505, where a user identifies a digital object located within an electronic space. In step 510, a user determines a directional axis on which to rotate the identified digital object within the electronic space. The system receives a user-specified command that specifies the direction of rotation for the digital object in step 515.

In step 520, the system ascertains which rotational mode is being used for the rotational command of step 515. A rotational mode can determine the rotationally dependent information for a digital object. Once the rotational mode is ascertained, then the system must determine if the rotational analogy between the digital object and its physical analog should be maintained throughout the rotation in step 525. If the analogy between the physical and digital object is to be kept, then step 530 occurs, in which the system computes the content for the digital object side.

If the analogy between the physical and digital is to be broken in step 525, then step 535 occurs, in which the system must determine if the shape and/or the quantity of sides of the digital object will change with the rotation. If the shape and/or quantity of sides are not impacted by the rotation, then step 540 occurs, in which the system computes the content for the digital object side. Should the system determine that either of these analogies to the physical analog is required to be broken in step 535, then the system proceeds to step 545, where the system must determine the new shape or quantity of sides for the digital object. Once that is complete, the system computes the content for the digital object side according to its determination from step 545 in step 550.

In step 555, the system renders a visual representation of the rotated digital object and the computer content according to its previous determinations. It is possible that the rotation of the digital object occurs as part of a visually animated process in step 560. Followed by step 565, in which the animated rotation results in a static display of the digital object and the content computer for the specified side is displayed.

In step 570, it is possible for the system to accept a user selection for another rotation of the digital object that is currently displayed. Should a user select to rotate the current digital object again, the system returns to and begins execution of this method at step 510. If a user does not want to rotate the current object again, it is possible that a different digital object could be selected for rotation, as shown in step 575. Should a user select another digital object to rotate, the system returns to and begins execution of this method at step 505. If rotation of another digital object is not desired, then the system proceeds to step 580, where the method ends.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that is carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method comprising:
   computing equipment, executing at least one program stored in one or more storage devices, identifying a digital object having N sides along a directional axis;
   computing equipment, executing at least one program stored in one or more storage devices, identifying M sets of content, wherein each set of content has a semantic meaning unrelated to graphical properties needed to visually render the digital object within a visual user interface, wherein a sequential ordering exists among the M sets of content;
   computing equipment, executing at least one program stored in one or more storage devices, displaying the digital object in the visual user interface; and
   computing equipment, executing at least one program stored in one or more storage devices, rotating the digital object within the visual user interface along the directional axis, which results in different ones of the N number of sides being sequentially displayed for the digital object within the visual interface,
   computing equipment, executing at least one program stored in one or more storage devices, displaying a data display item that shows one of the M sets of content, wherein the display data item is a displayed graphic element of the visual user interface distinct from the digital object, wherein each sequential increment of the N sides per the rotating results in a sequential increment through the order of the M sets of content being displayed in the data display item, wherein each change to one of the N sides per the rotating results in a corresponding change in the visually presented one of the M sets of content within the data display item, wherein a quantity of the M sets is different from a quantity of N sides.

2. The method of claim 1, further comprising:
   computing equipment, executing at least one program stored in one or more storage devices, rotating the digital object along the directional axis in an alternate direction, which is referred to as a sequential decrement; and
   computing equipment, executing at least one program stored in one or more storage devices, visually presenting the rotated object within the visual user interface, wherein each sequential decrement of the N sides results in a sequential decrement through the order of the M sets of content and results in a corresponding change in the visually presented one of the M sets of content within the data display item.

3. The method of claim 1, wherein an initial time a side of the digital object is displayed, an initial one of the M sets of data is displayed, and wherein an iterative cycle of rotating of the digital object to display that side for a second time within the visual user interfaces results in a different one of the M sets being displayed in the data display item, due to the quantity of the M sets being different from the quantity of N sides.

4. The method of claim 1, wherein the M sets of content correspond to a set of data organized within a hierarchy, said visual rendering step further comprising:
   computing equipment, executing at least one program stored in one or more storage devices, visually presenting data from a different level of the hierarchy within the data display item as each side of the digital object is visually presented.

5. The method of claim 4, wherein the digital object is permitted to rotate a number of times in sequence along the directional axis equivalent to a number of levels in the hierarchy.

6. The method of claim 4, wherein rotating the digital object along the directional axis in one direction results in a successive display of the M sets of content in the data display item, each rotation displaying a set of content corresponding to a successively superior level of the hierarchy.

7. The method of claim 6, wherein rotating the digital object along the directional axis in an alternate direction results in a successive display of the M sets of content in the data display item, each rotation displaying a set of content-corresponding to a successively subordinate level of the hierarchy.

8. The method of claim 1, wherein the N number of sides of the visually presented digital object is associated with the M sets of content, which refer to different ordered content sets, visually presented one per side as the digital object is rotated, wherein a geometry of the digital object as graphically represented in the visual user interface remains true to a physical analog regardless of a quantity for M.

9. A method for presenting digital objects within a computing interface comprising:
   displaying an N sided digital object in a visual user interface along with a data display item that shows one of a set of content from M sets of content, wherein the display data item is a displayed graphic element of the visual user interface that is distinct from the digital object, wherein each set of content has a semantic meaning unrelated to graphical properties needed to visually render the digital object within the visual user interface, wherein a sequential ordering exists among the M sets of content;

receiving a user selection to rotate the digital object along a designated axis to another of the N sides, where each time one of the N sides is presented in the visual user interface, one of the M sets of content is also presented within the data display item, wherein each sequential increment of the N sides results in a sequential increment through the order of the M sets of content and results in a corresponding change in the visually presented on of the M sets of content in the data display item;

visually rendering the digital object responsive to the receiving step so that a digital representation of the rotated object is approximately equivalent to a representation for a physical analog of the digital object when the physical analog is rotated in a corresponding fashion; and providing a user selectable mechanism to rotate the digital object in the visual interface in an alternate fashion, wherein when the user selectable mechanism is selected and a rotation occurs, an alternate sequential ordering and presentation of the M sets within the visual user interface of data results, wherein a quantity of the M sets is different from a quantity of N sides.

10. The method of claim 9, wherein the visually displayed one of the M content sets is not visually displayed on the physical analog.

11. The method of claim 10, wherein the M sets of content comprise user selectable commands.

12. The method of claim 10, wherein the M sets of content comprise metadata for the digital object.

13. The method of claim 9, wherein the user selectable mechanism results in the digital object having a number of sides along a directional axis that is different from a number of sides that the physical analog has along an equivalent directional axis.

14. The method of claim 13, wherein the number of sides of the digital object is dependent on a user selected direction of rotation.

15. The method of claim 9, wherein the user selectable mechanism includes a means to immediately return the digital object and the presented content set of the M content sets to a state that the digital object and M content sets were in before the rotation in the alternate fashion occurred.

16. A computing device comprising:
one or more storage devices;
program instructions stored on the one or more storage devices, said program instructions executing on hardware of the computing device to provide a graphical user interface, said graphical user interface comprising:
a N sided digital object which is rotatable within the graphical user interface responsive to a user selection;
a data display item for displaying one of M sets of content;
the M sets of content, wherein each set of content has a semantic meaning unrelated to graphical properties needed to visually render the digital object within the graphical user interface, wherein a sequential ordering exists among the M sets of content; and
a set of rotational controls, wherein a selection of one of the rotational controls results in the digital object being rotated by one side such that a cycle of N selections of the rotational control rotates the digital object back to an originally presented side wherein each sequential increment of the N sides results in a corresponding sequential increment through the order of the M sets of content as displayed in the data display item, wherein a quantity of the M sets is different from a quantity of N sides.

17. The computing device of claim 16, wherein selection of a different one of the rotational controls results in a different directional rotation of the digital object, and results in a change in sequencing of a corresponding one of the M sets of content being displayed in the data display item.

18. The computing device of claim 17, wherein the M sets of content include user selectable commands.

19. The computing device of claim 17, wherein the M sets of content comprise metadata for the digital object.

20. The computing device of claim 16, wherein the selection of the one and of the different one of rotational controls is automatically performed based upon a user selected rotational direction for the digital object.

* * * * *